US010956917B2

(12) United States Patent
Vaculin et al.

(10) Patent No.: US 10,956,917 B2
(45) Date of Patent: Mar. 23, 2021

(54) GENERATING RETAILING ANALYTICS USING SMART TEXTILES

(71) Applicant: International Business Machines Corporation, Armonk, NY (US)

(72) Inventors: Roman Vaculin, Bronxville, NY (US); Sudhanshu S. Singh, New Delhi (IN); Seema Nagar, Bangalore (IN); Kuntal Dey, New Delhi (IN)

(73) Assignee: International Business Machines Corporation, Armonk, NY (US)

( * ) Notice: Subject to any disclaimer, the term of this patent is extended or adjusted under 35 U.S.C. 154(b) by 561 days.

(21) Appl. No.: 15/641,355

(22) Filed: Jul. 5, 2017

(65) Prior Publication Data

US 2019/0012679 A1 Jan. 10, 2019

(51) Int. Cl.
*G06Q 30/02* (2012.01)
*G06Q 20/20* (2012.01)
*G06Q 30/06* (2012.01)

(52) U.S. Cl.
CPC ......... *G06Q 30/0201* (2013.01); *G06Q 20/20* (2013.01); *G06Q 30/0601* (2013.01)

(58) Field of Classification Search
None
See application file for complete search history.

(56) References Cited

U.S. PATENT DOCUMENTS

| | | | | |
|---|---|---|---|---|
| 2012/0323807 A1* | 12/2012 | Sabeta | ............... | G06Q 30/02 705/317 |
| 2013/0073473 A1* | 3/2013 | Heath | ............... | G06Q 30/06 705/319 |
| 2013/0249692 A1* | 9/2013 | Rasband | ............ | G06Q 30/0639 340/572.1 |
| 2014/0180798 A1* | 6/2014 | Bailey | ............... | G06Q 30/06 705/14.45 |
| 2015/0119070 A1* | 4/2015 | Harris | ............... | H04W 52/0209 455/456.1 |
| 2015/0145671 A1 | 5/2015 | Cohen et al. | | |
| 2015/0339726 A1 | 11/2015 | Herring et al. | | |
| 2016/0042315 A1* | 2/2016 | Field-Darragh | ... | G06Q 30/0282 705/28 |
| 2016/0055360 A1 | 2/2016 | Haugarth | | |
| 2017/0116552 A1* | 4/2017 | Deodhar | ............ | G06Q 10/06316 |
| 2017/0256149 A1* | 9/2017 | Carey | ............... | G08B 13/19613 |

FOREIGN PATENT DOCUMENTS

| | | |
|---|---|---|
| WO | 2015116192 A1 | 8/2015 |
| WO | 2016023027 A1 | 2/2016 |
| WO | 2016145489 A1 | 9/2016 |

* cited by examiner

*Primary Examiner* — Leland Marcus
(74) *Attorney, Agent, or Firm* — Daniel R. Simek

(57) ABSTRACT

Aspects of the present invention disclose a method, executed by a computer, for generating retailing analytics. The method includes receiving a spatial map corresponding to an environment. The method further includes receiving, from a purchasable item comprising one or more textile-integrated sensors, sensor information The purchasable item is located in the environment. The method further includes analyzing the sensor information to produce retail analytics corresponding to the purchasable item. The method further includes and sending the retail analytics to a client device. A computer program product and computer system corresponding to the above method are also disclosed herein.

17 Claims, 4 Drawing Sheets

GENERATING RETAILING ANALYTICS USING SMART TEXTILES

BACKGROUND OF THE INVENTION

This invention relates generally to the field of analytics, and more specifically, to generating retailing analytics.

In the field of retailing analytics, a business will benefit from access to reliable, efficient, and accurate consumer behavior metrics. One way of generating retailing analytics relies on the tagging of merchandise so that it may be tracked. However, tag sensors may require manual intervention to be fitted, are prone to manual errors, and may fall off of items. Thus, it is desirable to provide vendors with a better means of generating retailing analytics.

SUMMARY

As disclosed herein, a method, executed by a computer, for generating retailing analytics includes receiving a spatial map corresponding to an environment, receiving, from a purchasable item provided with one or more textile-integrated sensors, sensor information, wherein the purchasable item is located in the environment, analyzing the sensor information to produce retail analytics corresponding to the purchasable item, and sending the retail analytics to a client device. A computer program product and computer system corresponding to the above method are also disclosed herein.

DETAILED DESCRIPTION

The embodiments disclosed herein recognize that retailing analytics can be generated by monitoring smart garments as customers interact with the garments throughout a retail space previous to purchase. Retailing analytics generated in this manner may provide a retailer with past trends, present opportunities, and potential future trends. Embedding the sensors into the garments eliminates the need for tags, which may fall off of a garment or interfere with its aesthetics. Aspects of the proposed invention provide improvements over traditional approaches by generating pre-sale analytics and providing pre-sale consumer behavior and trends. Thus, the integration of smart textiles into items offered for retail may automate the analysis and generation of retailing analytics for garments.

It should be noted that references throughout this specification to features, advantages, or similar language herein do not imply that all of the features and advantages that may be realized with the embodiments disclosed herein should be, or are in, any single embodiment of the invention. Rather, language referring to the features and advantages is understood to mean that a specific feature, advantage, or characteristic described in connection with an embodiment is included in at least one embodiment of the present invention. Thus, discussion of the features, advantages, and similar language, throughout this specification may, but do not necessarily, refer to the same embodiment.

Furthermore, the described features, advantages, and characteristics of the invention may be combined in any suitable manner in one or more embodiments. One skilled in the relevant art will recognize that the invention may be practiced without one or more of the specific features or advantages of a particular embodiment. In other instances, additional features and advantages may be recognized in certain embodiments that may not be present in all embodiments of the invention.

These features and advantages will become more fully apparent from the following drawings, description and appended claims, or may be learned by the practice of the invention as set forth hereinafter. The present invention will now be described in detail with reference to the figures.

Figure 1:
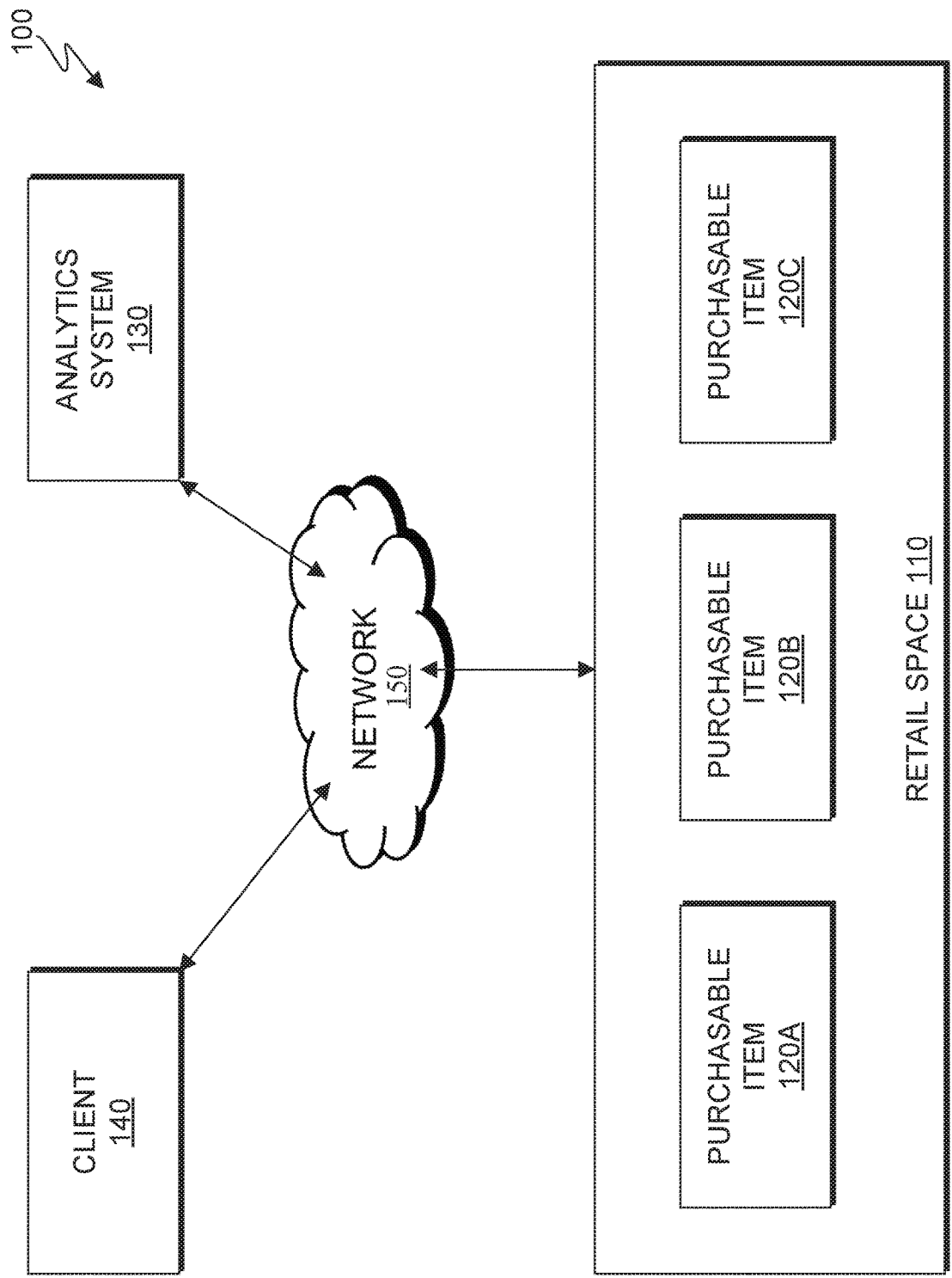
FIG. 1 is a block diagram depicting one embodiment of a retailing analytics environment in accordance with the present invention.

FIG. 1 is a block diagram depicting one embodiment of a retailing analytics environment 100 in accordance with the present invention. As depicted, FIG. 1 includes retail space 110 with purchasable items 120A-120C, analytics system 130, client 140, and network 150. Purchasable items 120A-120C may be tracked within retail space 110 and provide information to analytics system 130 via network 150. Analytics system 130 may generate retailing analytics, which may be shared with client 140.

Retail space 110 may include any physical location where retail may occur. Retail space 110 may include various areas corresponding to items for sale, points of sale (i.e. where the sales transaction occurs), fitting rooms, trial spaces, pedestrian areas, entrances, exits, and any other features typically associated with retail spaces. In some embodiments, areas of retail space 110 have more than one dedicated purpose. The purpose or usage of the various areas of retail space 110 may change over time. Retail space 110 may be digitally mapped so that merchandise may be tracked in a virtual representation of retail space 110.

Purchasable items 120A-120C may include any sort of merchandise that is wearable, such as garments, accessories, footwear, and the like. Each purchasable item 120 may be equipped with smart textile technology. Smart textiles (or smart fabrics) may include materials that enable digital components and electronics to be embedded in them. One important aspect of smart textiles is their ability to be provided with integrated functionalities. For example, conductive yarns may be fabricated with textile-based sensors made of fabric or metallic meshes and coated with conductive metal cores woven into the fabric. By incorporating conductors into a textile, it may act as a "wearable motherboard" of sorts, providing for the interconnection of electronic components such as processors and sensors.

Each item may be equipped with one or more sensors to gather information about consumer habits. Each purchasable item 120 might have one or more of a location sensor, a pressure sensor, a motion sensor, a temperature sensor, a light sensor, an audio sensor, a stress or strain sensor, and/or a proximity sensor. The information gathered by the sensor(s) can be stored on a storage media local to the smart textile, on a local server within the retail space, and/or on a remote server. For instance, a garment's movement through retail space 110 can be tracked using locomotion sensors coupled with locomotive state inference algorithms, enabling a retailer to infer whether and how frequently a garment is moved in a local location (rack or shelf) and/or across locations (rack to trial area). Purchasable item 120A-120C are not limited to garments like shirts and trousers; rather, each purchasable item 120 can be any sort of wearable article, including but not limited to, hats, gloves, shoes, headwear, jewelry, and/or accessories.

In some embodiments, communications from purchasable items are received by one or more transceivers (not shown) placed around retail space 110, which in turn relay to analytics system 130 via network 150. Transceivers can communicate with purchasable items through various wireless protocols, including near-field communication, Bluetooth®, Wi-Fi, and/or any other wireless communication protocols. In some embodiments, purchasable items 120 can have a functionality added so an alarm or alert can be set off to inform nearby law enforcement, loss prevention units, and/or client device 140 that a garment has been potentially removed from retail space 110 without being purchased.

Analytics system 130 may be a device capable of receiving, as input, sensor information from purchasable items 120A-120C, analyzing the information, and outputting retailing analytics. The analytics system 130 is used to interpret, generate, and deliver analytic data to client device 140 via network 150 for the user's benefit. However, it should be noted that although FIG. 1 depicts the analytics system 130 as remote from each purchasable item 120, in some embodiments analytics system 130 is located within retail space 110. In some embodiments, analytics system 130 performs some or all of the operations of analytics generation method 300, which is described in further detail below.

Client 140 may include any device such a laptop computer, a tablet computer, a netbook computer, a personal computer (PC), a desktop computer, a personal digital assistant (PDA), a smart phone, a thin client, or any programmable electronic device capable of executing computer readable program instructions. Client 140 may include internal and external hardware components, as depicted and described in further detail with respect to FIG. 4.

Client 140 may be viewed by the user at any given time and in any given place. Client 140 can be a multitude of different devices, some of which are mobile and thus are capable of functioning while physically distant from the retail space 110. Client 140 may also store previous retailing analytics and provide historical perspectives to the user. Further, client 140 may track current shoppers' interactions with purchasable items 120 in retail space 110 in real-time. Thus, client 140 may be capable of tracking the current and historical path of each purchasable item 120. Similarly, using other sensors, client 140 may track both historical and current metrics regarding each purchasable item 120 such as temperature data, light data, pressure data, stress/strain data, proximity data, audio data, and the like. Client 140 can also made to hold all of the information however it is also possible client 140 can be used to hold part of the information received and/or could be empty and client's storage 140 could be unutilized.

Network 150 can be, for example, a local area network (LAN), a wide area network (WAN) such as the Internet, or a combination of the two, and include wired, wireless, or fiber optic connections. In general, network 150 can be any combination of connections and protocols that will support communications between retail space 110, purchasable items 120A-120C, analytics module 130, and/or client 140 in accordance with an embodiment of the present invention.

Figure 2:
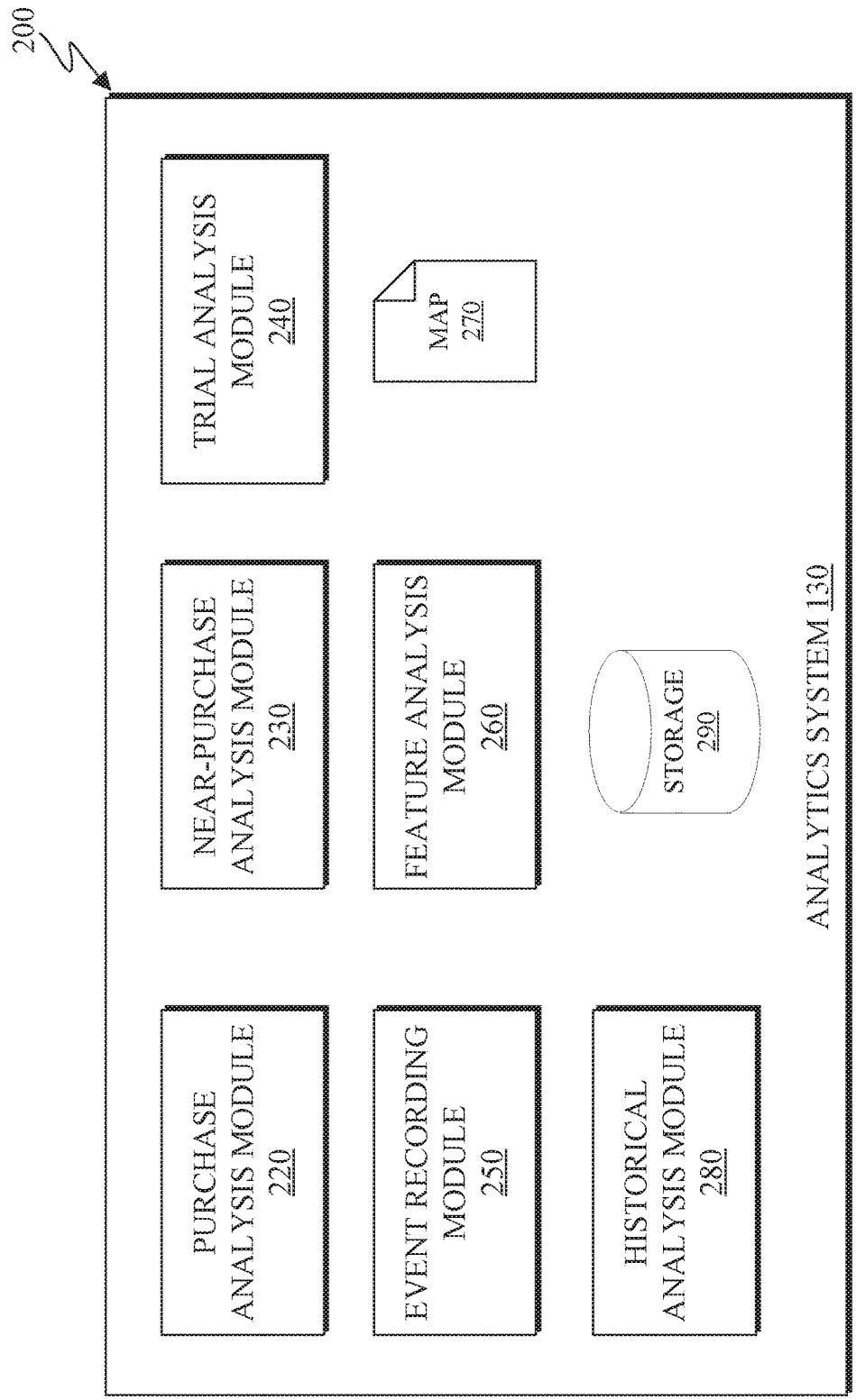
FIG. 2 is a block diagram depicting one embodiment of an analytics system in accordance with the present invention.

FIG. 2 is a block diagram depicting one embodiment of analytics generation system 200 in accordance with the present invention. As depicted, FIG. 2 includes analytics system 130, purchase analysis module 220, near-purchase analysis module 230, trial analysis module 240, event recording module 250, feature analysis module 260, map 270, historical analysis module 280, and storage 290. Each analysis module may cooperate to provide analytics regarding the patterns and behaviors of consumers.

Purchase analysis module 220 may be used to gather and analyze data related to all purchases occurring within the retail space 110. Near-purchase analysis module 230 may look at data to determine whether a consumer has taken steps to purchase an item but ultimately never makes the purchase. Trial analysis module 240 may determine whether a consumer has tried on the item or otherwise tested the item to determine item performance.

Event recording module 250 may log events as they occur. Feature analysis module 260 may determine item commonalities between items purchased, nearly purchased, and/or tried. Map 270 may include a virtual map representing retail space 110. Historical analysis module 280 can be used to compare trends between historical and/or current analytics. Storage 290 can be used to store data for the various modules of analytics system 130 and/or store all incoming purchasable item 120 data.

Analytics system 130 can have at least one modules present to operate. The depicted embodiment should not be taken to limit the analytics system 130 to having all of these modules, as there can be as few as one. In some embodiments, analytics system 130 is separate from client 140, while in other embodiments, analytics system 130 is associated with client 140.

Purchase analysis module 220 can be a module dedicated to generating information about the purchasing patterns of consumers. Purchase analysis module 220 can used to generate metrics and/or analytics about consumer purchasing patterns; some of these metrics might include, but are not limited to, number of items purchased, cost of items purchased, average purchase amount (either by cost or by number of items), items most commonly purchased, items returned, and/or rate of sales. Purchase analysis module 220 can determine these analytics by receiving raw data from purchasable items 120A-120C and then generate metrics which can be used to quantify consumer behavior. Purchase analysis module 220 can determine metrics by gathering all of the raw data being received and transforming it into retailing analytics, which may then be reported to client 140. The user may view the generated retailing analytics on client 140 in order to make strategic business decisions. Purchase analysis module may suggest consumers who are potentially fit for a focus groups. Purchase analysis module 220 can operate independently of, or in conjunction with, the other modules associated with analytics system 130.

In some embodiments, purchase analysis module 220 can detect a variety of scenarios to determine retailing analytics based on purchases. Purchase analysis module 230 can also gather information in the trial area, for instance, via pressure and/or stress/strain sensors in each purchasable item 120 to determine whether an article fit properly or was loose fitting, stretched, and/or tight; this can give analytic information about consumer preferences as to the degree to which a particular article fits the customer with respect to its reported and actual dimensions. Purchase analysis module 220 can also determine when items are picked up from the rack never tried-on but simply purchased quickly without a trial period.

Near-purchase analysis module 230 can be a module dedicated to the generation of near-purchase analytics. Near-purchase analysis module 230 can determine whether a consumer has taken steps to purchase an item, but has ultimately failed to complete the sale. By monitoring whether an item is travelling, how far an item is from its original location, and/or whether an item was returned to its original location could all indicate whether a near sale event has occurred. Near-purchase analysis module 230 is able to distinguish whether an item is being reoriented within retail space 110 or whether the item was actually being contemplated for purchase. Near-purchase analysis module 230 can work with other modules (such as trial analysis module 240) to help distinguish near-purchase events from mere movements or repositionings within retail space 110. Near-purchase analysis module 230 can also be used in to identify near sale opportunities happening in real-time, so that actions might be taken to convert incipient near-purchases into actual purchases. In some embodiments, near-purchase analysis module 230 tracks returned or exchanged items and registers a near-sale when a sold item is returned or exchanged. Near-purchase analysis module 230 can be used independently of, or in conjunction with, other modules of analytics system 130 to generate further analytics.

In some embodiments, near-purchase analysis module 230 may determine a variety of situations and can distinguish each event individually, generating highly specific retailing analytics data. There can be given situations where an item is always on a given rack, but is never picked up, even though other similar garments on the rack are handled often; this can be tracked using the proximity sensor. In other embodiments, Near-purchase analysis module 230 can determine if a garment is picked up and looked at frequently but is never taken to a trial area. Near-purchase analysis module 230 may also detect a shortened trial period, which may indicate that the item was taken to a trial area but quickly returned to the rack. Further, a light sensor can be added to items such as shoes in boxes where the change in light can signify a customer looking at or inspecting a pair of shoes. Near-purchase analysis module 230 can also gather information while a purchasable item 120 is in the trial area, for instance, via pressure sensors in each purchasable item 120 that determine whether an article fit, was loose fitting, was stretched, and/or too tight. Near-purchase analysis module 230 can also determine if a garment is taken off the rack to a trial area and placed into a shopping cart, but is later removed and the purchase never completed.

Trial analysis module 240 can be used to determine whether a consumer is trying on or otherwise testing a garment. Trial analysis module 240 can be helpful to gather analytics corresponding to duration of time in fitting rooms, rigor of tests performed, and/or how long performance review period takes. Trial analysis module 240 can be used to quantify consumer behaviors during the garment trial period. These consumer behaviors may include fitting a garment or testing a garment in a trial area (such as a fitting room, sporting environment, treadmill, track, and the like). Trial analysis module 240 may generate analytics that describe how any given consumer might behave once they have made it to the trial area of retail space 110. Trial analysis module 240 can generate useful analytics to suggest whether a longer or shorter trial periods can increase the possibility of a sale; and can be used to facilitate streamlined fitting room/trial area procedures. For example, a heat sensor could be incorporated into a garment to aid in determining whether a trial period has been engaged, length of trial period, and rigor of trials performed on garment.

Event recording module 250 can be used to capture all of the events happening and record at what time each event occurs. Event recording module 250 can thus serve as a means of recording when certain events are happening at a particular time. Time module 250 may also identify particular times of day that certain events occur with greater or lesser frequency. Event recording module 250 may be used in conjunction with one or more of the other modules of analytics system 130 in order to identify trends over time.

Feature analysis module 260 can be used to pinpoint commonalities between items. Feature analysis module 260 can be used in tandem with purchase analysis module 220 and near-purchase analysis module 230 to generate analytics revolving around clothing trends. Feature analysis module 260 can be used to find common features between items sold or items nearly sold to generate analytics about which clothes are being most highly sought after. Feature analysis module 260 may identify sales trends in various garments that share in common one or more of a certain color, pattern, size, material, graphics, brand, logo, seasonality, and the like. For example, feature analysis module 260 may identify that camouflaged outerwear experiences a surge in sales at a particular time of year. Feature analysis module 260 can used to with historical analysis module 280 as well to generate historical analytics of specific features over a given time period.

Map 270 may include a virtual representation of retail space 110. Map 270 can be stored on any devices and is not limited to being stored on analytics system 130. Map 270 can be stored and displayed on client 140. Map 270 may identify locations of interest throughout retail space 110, such as where garments are offered for sale, trial areas, point-of-sales, ingresses, egresses, pedestrian paths, and the like. In some embodiments, map 270 is divided into sections according to the locations of interest.

In some embodiments, map 270 can be used to determine and view areas of high event density (known as a heat map). The high event density map can be generated by using one or more analysis modules, providing a history of events and their associated locations. Furthermore, a combination of high event density and another analysis module can show areas where a particular event has occurred with great frequency. In some embodiments, it possible to use high event density maps in real-time to show where events are occurring at a given point in time.

Historical analysis module 280 can be used to look at previous trends and/or compare previous trends with current trends. Historical analysis module 280 can look at previous trends to generate predictive analytics to show future consumer trends based on previous and current analytic data. Historical analysis module 280 can access stores of analytic data on in a variety of locations such as, but not limited to, storage 290, client 140, or other storage that is accessible via network 150. Historical analysis module 280 can also work in real-time to generate consumer analytics based on data taken from the same day, week, or season. Historical analysis module 280 may be used to generate analytics about a specific purchasable item individually (such as purchasable item 120A) for its whole history in retail space 110.

Storage 290 may be any non-volatile storage media known in the art. For example, storage 290 can be implemented with a tape library, optical library, one or more independent hard disk drives, or multiple hard disk drives in a redundant array of independent disks (RAID). Similarly, data on storage 290 may conform to any suitable storage architecture known in the art, such as a file, a relational database, an object-oriented database, and/or one or more tables.

Storage 290 can used to store all of the data received, generated, and sent in the retailing analytics generation system. Storage 290 can also be used to hold all information, however it is also possible storage 290 can be used to hold part of the information received and/or could be empty and the storage 290 could be unutilized. In some embodiments, storage 290 is physically remote from retail space 110 and is accessible by network 150.

Figure 3:
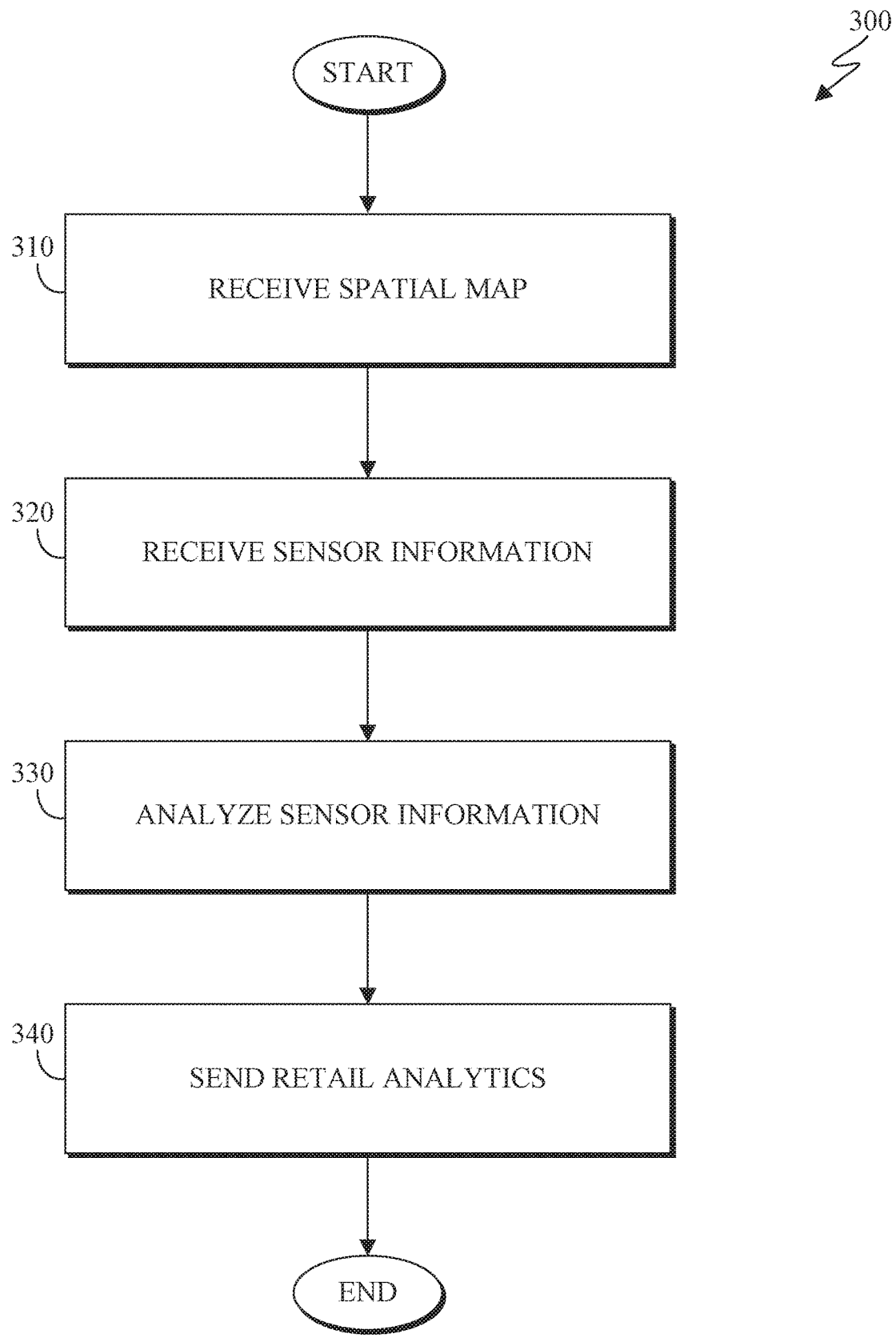
FIG. 3 is a flow chart depicting one embodiment of an analytics generation method in accordance with the present invention.

FIG. 3 is a flow chart depicting one embodiment of a retail analytics generation method 300 in accordance with the present invention. As depicted, retail analytics generation method 300 includes receiving (310) a spatial map, receiving (320) sensor information, analyzing (330) the sensor information, and sending (340) analytics. Analytics generation method 300 may generate retailing analytics using information from purchasable items 120A-120C in retail space 110, as well as analysis provided from one or more of the modules of analytics system 130 as described in FIG. 2.

Receiving (310) a spatial map may include receiving, storing, or opening a spatial map, such as map 270 of retail space 110. In some embodiments, the spatial map of retail space 110 is created and stored in the analytics system 130; in other embodiments, the spatial map is stored in remote storage or on client 140. The spatial map may provide an environment where retail space 110 interactions can be virtually represented as they occur historically and/or in real-time.

Receiving (320) sensor information may include receiving information from any sensor(s) associated with purchasable items 120. In some embodiments, the sensor information can be collected in real-time, or can be sampled at specific user-defined intervals. Sensor information may be collected in response to specific events, such as detecting that a purchasable item 120 is in motion. Once the sensor information has been received it can be stored on analytics system 130, client 140, or network 150. The stored sensor information may act as a main source where analytics system 130 modules will use to be begin to generate retailing analytics data.

Analyzing (330) sensor information might include using analytics system 130 to generate retailing analytics. The sensor information may be analyzed by the various modules of analytics system 130 and then saved. The data can be saved to storage 270, client 140, and/or other storage accessible via network 150.

Sending (340) analytics may include sending the output of analytics system 130 to client device 140. The analytics can be sent to client 140 via network 150, or potentially reside on client 140 device itself. The retailing analytics sent may include data generated from analytics system 130, raw data not subject to analytics system 130, and/or real-time data about movements of particular articles. The user can interact with client 140 and can choose or filter which analytics the user wishes to view.

Figure 4:
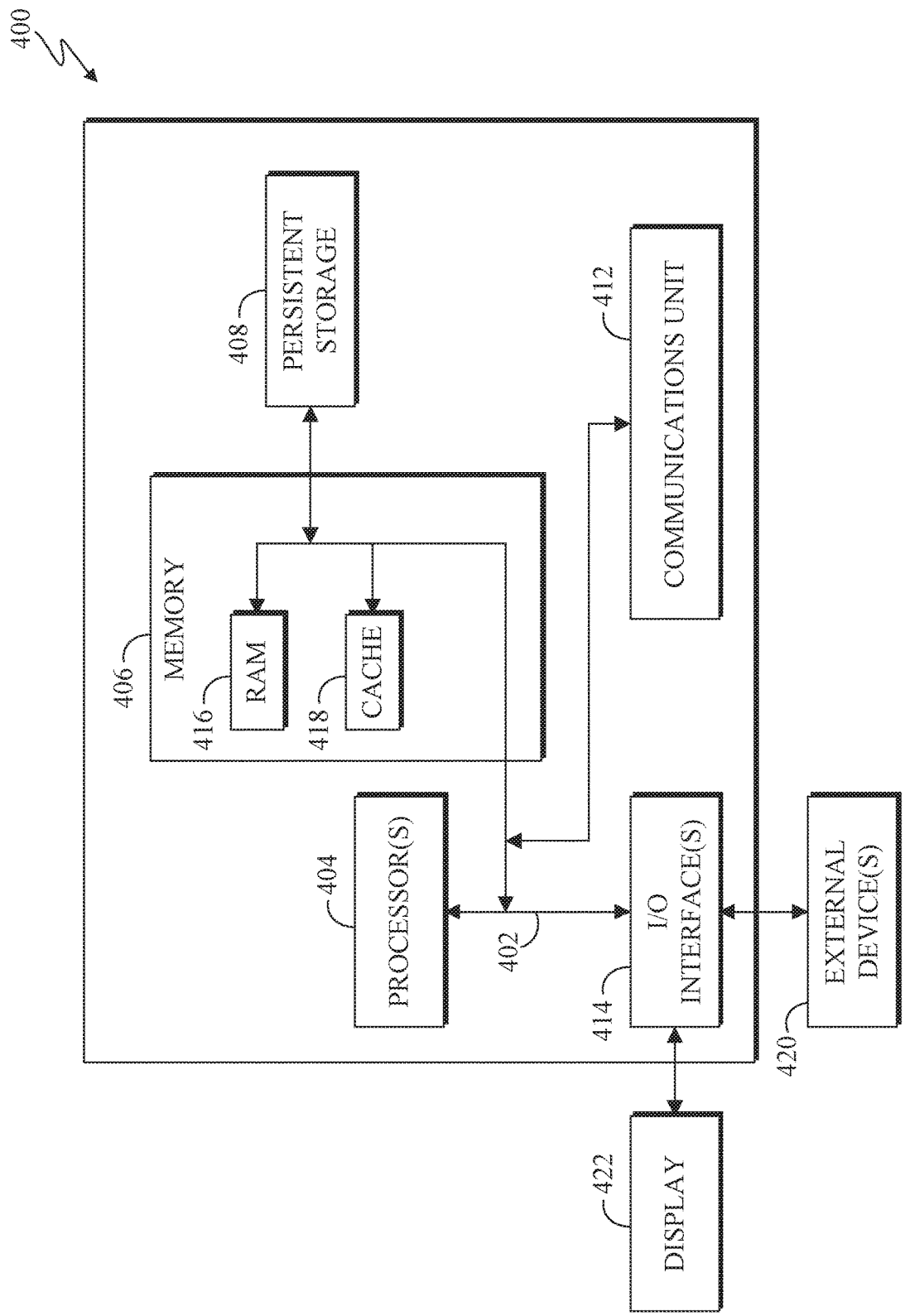
FIG. 4 is a block diagram depicting one example of a computing apparatus (i.e., computer) suitable for executing the methods disclosed herein.

FIG. 4 is a block diagram depicting components of a computer 400 suitable for executing the methods disclosed herein. It should be appreciated that FIG. 4 provides only an illustration of one embodiment and does not imply any limitations with regard to the environments in which different embodiments may be implemented. Many modifications to the depicted environment may be made.

As depicted, the computer 400 includes communications fabric 402, which provides communications between computer processor(s) 404, memory 406, persistent storage 408, communications unit 412, and input/output (I/O) interface(s) 414. Communications fabric 402 can be implemented with any architecture designed for passing data and/or control information between processors (such as microprocessors, communications and network processors, etc.), system memory, peripheral devices, and any other hardware components within a system. For example, communications fabric 402 can be implemented with one or more buses.

Memory 406 and persistent storage 408 are computer readable storage media. In the depicted embodiment, memory 406 includes random access memory (RAM) 416 and cache memory 418. In general, memory 406 can include any suitable volatile or non-volatile computer readable storage media.

One or more programs may be stored in persistent storage 408 for execution by one or more of the respective computer processors 404 via one or more memories of memory 406. The persistent storage 408 may be a magnetic hard disk drive, a solid state hard drive, a semiconductor storage device, read-only memory (ROM), erasable programmable read-only memory (EPROM), flash memory, or any other computer readable storage media that is capable of storing program instructions or digital information.

The media used by persistent storage 408 may also be removable. For example, a removable hard drive may be used for persistent storage 408. Other examples include optical and magnetic disks, thumb drives, and smart cards that are inserted into a drive for transfer onto another computer readable storage medium that is also part of persistent storage 408.

Communications unit 412, in these examples, provides for communications with other data processing systems or devices. In these examples, communications unit 412 includes one or more network interface cards. Communications unit 412 may provide communications through the use of either or both physical and wireless communications links.

I/O interface(s) 414 allows for input and output of data with other devices that may be connected to computer 400. For example, I/O interface 414 may provide a connection to external devices 420 such as a keyboard, keypad, a touch screen, and/or some other suitable input device. External devices 420 can also include portable computer readable storage media such as, for example, thumb drives, portable optical or magnetic disks, and memory cards.

Software and data used to practice embodiments of the present invention can be stored on such portable computer readable storage media and can be loaded onto persistent storage 408 via I/O interface(s) 414. I/O interface(s) 414 may also connect to a display 422. Display 422 provides a mechanism to display data to a user and may be, for example, a computer monitor.

The programs described herein are identified based upon the application for which they are implemented in a specific embodiment of the invention. However, it should be appreciated that any particular program nomenclature herein is used merely for convenience, and thus the invention should not be limited to use solely in any specific application identified and/or implied by such nomenclature.

The embodiments disclosed herein include a system, a method, and/or a computer program product. The computer program product may include a computer readable storage medium (or media) having computer readable program instructions thereon for causing a processor to carry out the methods disclosed herein.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowcharts and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

What is claimed is:

1. A method for generating retailing analytics, the method comprising:
   receiving a spatial map that includes a virtual representation of a retail space;
   receiving, from a purchasable item comprising one or more textile-integrated sensors, sensor information, wherein the purchasable item is located in the retail space;
   generating retail analytics corresponding to the purchasable item, wherein the retail analytics correspond to activity of the purchasable item relative to the virtual representation of the retail space in the spatial map, derived by analyzing the sensor information from the purchasable item prior to a purchase transaction of the purchasable item, wherein analyzing the sensor information to produce retail analytics further comprises:
   analyzing sensor information received from the purchasable item and from at least one additional purchasable item, the at least one additional purchasable item provided with one or more textile-integrated sensors, wherein the retail analytics further comprise a common feature metric; and sending the retail analytics to a client device.

2. The method of claim 1, wherein the one or more sensors are selected from the group consisting of an audio sensor, location sensor, a pressure sensor, a motion sensor, a temperature sensor, a light sensor, and a proximity sensor.

3. The method of claim 1, wherein the retail analytics further comprise one or more metric selected from the group consisting of a purchase metric, a near-purchase metric, a trial metric, an event recording metric, and a historical purchase metric.

4. The method of claim 1, wherein the purchasable item is not sold, and further comprising:
    determining, from the sensor information, that the purchasable item has been removed from the environment; and
    sending an alert to the client device.

5. The method of claim 1, wherein the spatial map comprises one or more designated zones, wherein each designated zone is selected from the group consisting of a point-of-sale location, a trial location, and an item retail location.

6. The method of claim 1, further comprising:
    presenting the spatial map of the environment on the client device; and
    tracking a path of the purchasable item in real time on the spatial map in relation to the virtual representation of the retail space.

7. A computer system for generating retailing analytics, the computer system comprising:
    one or more computer processors;
    one or more computer readable storage media;
    program instructions stored therein for execution by at least one of the one or more computer processors, the program instructions comprising instructions for:
    receiving a spatial map that includes a virtual representation of a retail space;
    receiving, from a purchasable item provided with one or more textile-integrated sensors, sensor information, wherein the purchasable item is located in the retail space;
    generating retail analytics corresponding to the purchasable item, wherein the retail analytics correspond to activity of the purchasable item relative to the virtual representation of the retail space in the spatial map, derived by analyzing the sensor information from the purchasable item prior to a purchase transaction of the purchasable item, wherein analyzing the sensor information to produce retail analytics further comprises:
        analyzing sensor information received from the purchasable item and from at least one additional purchasable item, the at least one additional purchasable item provided with one or more textile-integrated sensors, wherein the retail analytics further comprise a common feature metric; and
    sending the analytics to a client device.

8. The computer system of claim 7, wherein the one or more sensors are selected from the group consisting of an audio sensor, a location sensor, a pressure sensor, a motion sensor, a temperature sensor, a light sensor, and a proximity sensor.

9. The computer system of claim 7, wherein the retail analytics further comprise one or more metric selected from the group consisting of a purchase metric, a near-purchase metric, a trial metric, an event recording metric, and a historical purchase metric.

10. The computer system of claim 7, wherein the purchasable item is not sold, and further comprising:
    determining, from the sensor information, that the purchasable item has been removed from the environment; and
    sending an alert to the client device.

11. The computer system of claim 7, wherein the spatial map comprises one or more designated zones, wherein each designated zone is selected from the group consisting of a point-of-sale location, a trial location, and an item retail location.

12. The computer system of claim 7, further comprising instructions for:
    presenting the spatial map of the environment on the client device; and
    tracking a path of the purchasable item in real time on the spatial map in relation to the virtual representation of the retail space.

13. A computer program product for generating retailing analytics, the computer program product comprising:
    one or more computer readable storage media and program instructions stored on the one or more computer readable storage media, the program instructions comprising instructions for:
    receiving a spatial map that includes a virtual representation of a retail space;
    receiving, from a purchasable item comprising one or more textile-integrated sensors, sensor information, wherein the purchasable item is located in the retail space;
    generating retail analytics corresponding to the purchasable item, wherein the retail analytics correspond to activity of the purchasable item relative to the virtual representation of the retail space in the spatial map, derived by analyzing the sensor information from the purchasable item prior to a purchase transaction of the purchasable item, wherein analyzing the sensor information to produce retail analytics further comprises:
        analyzing sensor information received from the purchasable item and from at least one additional purchasable item, the at least one additional purchasable item provided with one or more textile-integrated sensors, wherein the retail analytics further comprise a common feature metric; and
    sending the analytics to a client device.

14. The computer program product of claim 13, wherein the one or more sensors are selected from the group consisting of a location sensor, a pressure sensor, a motion sensor, a temperature sensor, a light sensor, and a proximity sensor.

15. The computer program product of claim 13, wherein the retail analytics further comprise one or more metric selected from the group consisting of a purchase metric, a near-purchase metric, a trial metric, and an event recording metric.

16. The computer program product of claim 13, wherein the purchasable item is not sold, and further comprising:
    determining, from the sensor information, that the purchasable item has been removed from the environment; and
    sending an alert to the client device.

17. The computer program product of claim 13, wherein the spatial map comprises one or more designated zones, wherein each designated zone is selected from the group consisting of a point-of-sale location, a trial location, and an item retail location.

* * * * *